United States Patent [19]

Muzzy et al.

[11] Patent Number: 5,409,757
[45] Date of Patent: Apr. 25, 1995

[54] FLEXIBLE MULTIPLY TOWPREG TAPE FROM POWDER FUSION COATED TOWPREG

[75] Inventors: John D. Muzzy; Jonathan S. Colton, both of Atlanta, Ga.

[73] Assignee: Georgia Tech Research Corporation, Atlanta, Ga.

[21] Appl. No.: 132,583

[22] Filed: Nov. 10, 1993

Related U.S. Application Data

[62] Division of Ser. No. 848,297, Mar. 9, 1992, Pat. No. 5,296,064, Ser. No. 700,559, May 15, 1991, Pat. No. 5,171,630, and Ser. No. 339,297, Apr. 17, 1989, Pat. No. 5,094,883.

[51] Int. Cl.⁶ ............................................. B32B 5/12
[52] U.S. Cl. ................................. 428/114; 428/294; 428/332; 428/902
[58] Field of Search ................ 428/114, 294, 902, 332

[56] References Cited

U.S. PATENT DOCUMENTS

| | | | |
|---|---|---|---|
| 5,128,198 | 7/1992 | Dyksterhouse et al. | 428/408 |
| 5,188,878 | 2/1993 | Takezawa et al. | 428/114 |
| 5,198,281 | 3/1993 | Muzzy et al. | 428/114 |
| 5,279,893 | 1/1994 | Hattori et al. | 428/114 |

*Primary Examiner*—James J. Bell
*Attorney, Agent, or Firm*—Deveau, Colton & Marquis

[57] ABSTRACT

An improved flexible towpreg tape of a known geometry and a method of production therefor. The improved flexible towpreg tape is formed from a plurality of reinforcing filaments fusion coated with matrix forming material, the reinforcing filaments being substantially wet-out by the matrix forming material, and the towpreg tape having multiple plies with an average thickness less than about 100 microns. The method of production for the improved flexible towpreg tape includes the steps of coating the reinforcing filaments with the matrix forming material in a manner causing interfacial adhesion of the matrix forming material to the reinforcing filaments; forming a towpreg by heating the matrix forming material contacting the reinforcing filaments until the matrix forming material liquefies and coats the reinforcing filaments; and forming the towpreg tape under pressure and elevated temperature in a means for creating a known tape geometry.

5 Claims, 12 Drawing Sheets

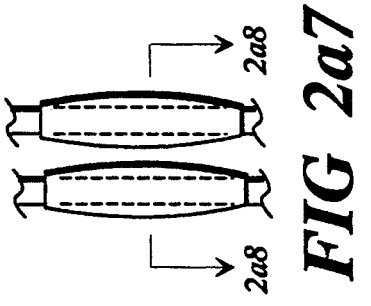
FIG 2a1
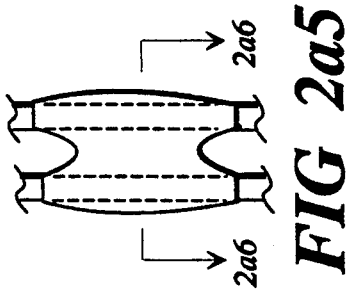
FIG 2a3
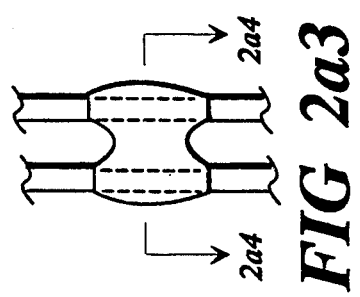
FIG 2a5
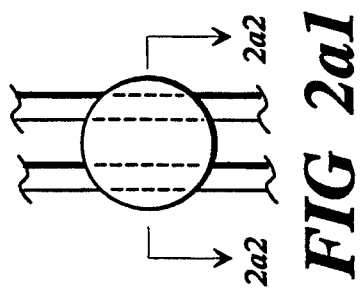
FIG 2a7
FIG 2a2
FIG 2a4
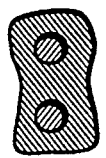
FIG 2a6
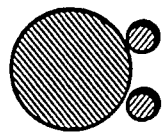
FIG 2a8

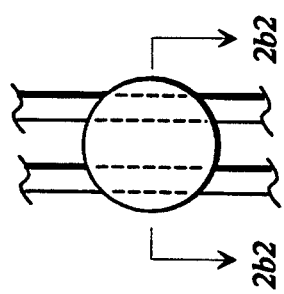
FIG 2b1
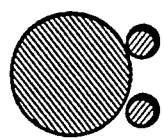
FIG 2b2
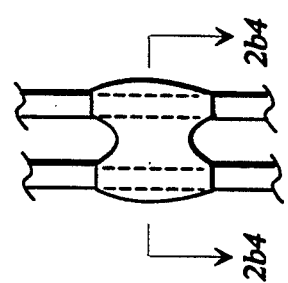
FIG 2b3
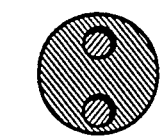
FIG 2b4
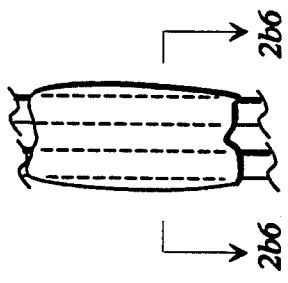
FIG 2b5
FIG 2b6

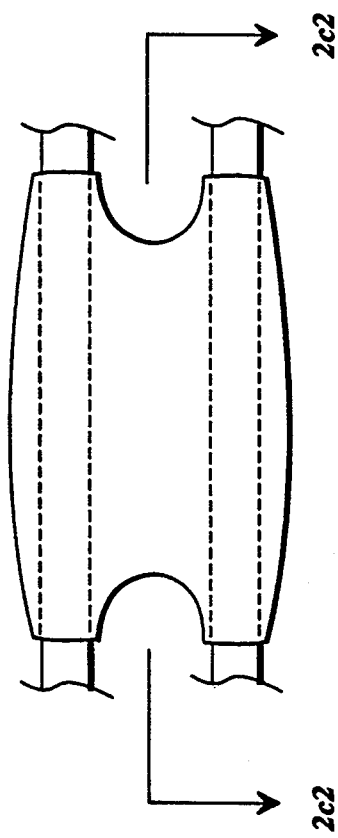
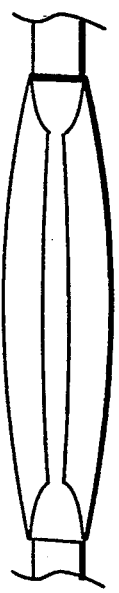
FIG 2c1
FIG 2c2

FLEXIBLE MULTIPLY TOWPREG TAPE FROM POWDER FUSION COATED TOWPREG

This is a divisional of application(s) Ser. No. 07/848,297, filed on Mar. 9, 1992, now U.S. Pat. No. 5,296,064, and Ser. No. 07/700,559, filed May 15, 1991, now U.S. Pat. No. 5,171,630; and Ser. No. 07/339,297, filed Apr. 17, 1989, now U.S. Pat. No. 5,094,883.

BACKGROUND OF THE INVENTION

1. Field of the Invention

The present invention is directed to flexible multiply towpreg tape and a method of production therefor and, more specifically, a flexible multiply towpreg tape of uniform dimensions and accurate geometry suitable for filament winding, pultrusion, and the like, and a method for producing such a towpreg tape.

2. Discussion of the Prior Art

Composites comprising fibers or filaments (herein used interchangeably) combined with a matrix resin are known in the art and typically are called "towpregs". Conventional towpreg consists of hundreds or thousands of the filaments embedded in a continuous mass of the matrix. The advanced reinforcing filaments typically used are available commercially in continuous form in "bundles" of filaments known as "tows" which vary widely in number of filaments per tow. Many matrix resins are available, however two kinds of matrix resin systems dominate the prior art: thermoset and thermoplastic polymers.

Thermoplastic polymers have been used widely as matrices for composites, and are potentially useful as matrices for advanced composites for aerospace applications. Thermoplastics have advantages over thermosetting materials in fracture toughness, impact strength, and environmental resistance. Thermoplastics also provide towpregs with indefinite shelf life, give the fabricator better quality assurance, and avoid the storage and refrigeration problems associated with thermosetting towpreg. Thermoplastic molecules are tougher than the rigid cross-linked network of the thermosets; few of the toughened thermosets have met the combined requirements of damage tolerance and hot/wet compression strength necessary for use in aerospace composites. The disadvantage of thermoplastic polymers as a composite matrix material is the difficulty of uniformly coating the fibers due to the high viscosity of the molten polymer. Thermoplastic towpreg typically is rigid and is not well-suited for weaving, braiding, or the filament winding of complex shapes or pultrusion; heat must be focused at the point of contact to achieve towpreg conformability during layup.

Thermoset polymers also are used as matrices for towpreg. Towpreg containing thermosetting prepolymer, although relatively flexible, is tacky, thus requiring a protective release coating, which must be removed prior to use. While thermoset towpreg is acceptable for filament winding, its tackiness and the requirement of a protective release coating make thermoset towpreg unfeasible for weaving, braiding, or the production of chopped fiber feed stock for bulk or sheet molding compounds.

Two other types of towpreg are metal matrix towpreg, which is similar to thermoplastic towpreg, and partially cured ceramic towpreg, which is similar to thermoset towpreg. However, due to the limited markets for metal and ceramic composites, these materials are not generally available and have not been the focus of developments in manufacturing technology. Metal and ceramic matrix towpregs can be manufactured in a manner and form analogous to thermoplastic and thermosetting towpregs.

Continuous fiber tow prepregs can be produced by a number of impregnation methods including hot melt, solution, emulsion, slurry, surface polymerization, fiber commingling, film interleaving, electroplating, and dry powder techniques.

In hot melt processing, impregnation may be accomplished by forcing the fiber and resin through a die at high temperature under conditions that create high shear rates. Due to the high temperatures of this process, the thermoplastic material can degrade. Other disadvantages of this process include the high stress applied to the tow and difficulties in impregnating the tow with thermoplastics.

In solution coating, the matrix material is dissolved in solvent and the fiber tow is passed through this solution and then dried to evaporate the solvent. Two disadvantages associated with this process are that thermoplastics usually exhibit limited solubility at high concentration, and most engineering thermoplastics cannot be dissolved in a low boiling-point solvent at room temperature. Additionally, high solution viscosity results in the same impregnation problems as with hot melt, as well as causing the fibers to stick together. Another problem is the difficulty in removing the solvent. Further, traces of solvent left in the towpreg lead to undesirable porosity in the composites.

An emulsion process is one way to apply powdered polymer matrix material with a very small particle size to fiber tow by synthesizing the resin as an aqueous emulsion with a surfactant. The problem with this process is that the removal of the surfactant from the final composite is difficult.

Slurry coating or wet powder processing is a non-solvent coating technique designed to resolve the problem of the insolubility of most thermoplastics in a solvent at room temperature. In slurry coating, the powder is suspended in a liquid medium, generally water, wherein no solvency exists between the resin and the medium, and the fiber bundles are drawn through the slurry. The slurry particulate matrix does not wet-out the fiber, resulting in the need for higher pressures to consolidate the matrix and fibers into a composite. This towpreg can be tacky and therefore, is not suitable for weaving or braiding. Other disadvantages include the necessity for the removal of the liquid medium, volatiles, and dispersants or surfactants, which are used to form the polymer/liquid colloidal state, the likelihood of aggregates in the slurry caused by poor mixing, and the possibility that polymer particles will settle during processing.

To achieve intimate mixing in emulsion or slurry coating, the particle size of the slurry or emulsion should be smaller than the fiber diameter. For many of the thermoplastics that cannot be made by emulsion or dispersion polymerization, it is extremely difficult to produce such fine powder. Thus, a coarse blend between fibers and particles is obtained. The quality of the blend decreases as the particle size increases, leading to poor matrix distribution in the consolidated composite.

In surface polymerization, coating results from the polymerization of the polymer matrix on the fiber substrate. Disadvantages associated with this process include the need to remove undesired materials, such as solvent, inhibitor or by-products of the polymerization reactions. Surface polymerization only can be conducted by special techniques, such as electropolymerization, which cannot be used to produce many of the polymeric matrices of commercial interest.

In fiber commingling, the polymeric matrix is introduced in fibrous form. Polymeric and reinforcing fibers are mingled as dry blends; however, wetting of the fiber by a process, such as melting the polymer fiber is deferred until the composite is consolidated. Effective impregnation depends on the degree of randomness of the intermingling of the resin and fiber throughout the system. As no wetting of the reinforcing fibers by the matrix material occurs in this tow, higher pressures are needed to consolidate the towpreg under equivalent processing times and temperatures into a composite, as compared to completely wetted towpreg.

Film casting is one method for producing prepreg that resolves some of the problems associated with hot melt impregnation of thermoplastics. It consists of stacking a film layer of matrix material cast from either hot melt or solution over spread tow. The fibers sandwiched between two films are heated and calendered to force the resin into the fibers.

A flexible metal matrix towpreg has been produced by electroplating by American Cyanamid. Each fiber is completely wet-out and uniformly coated with the metal matrix. This towpreg has desirable properties for weaving, braiding, filament winding, or for conversion to bulk or sheet molding compound feedstocks. Additionally, this towpreg does not require high pressure for consolidation. However, electroplating has a disadvantage in that systems which can be adapted to electroplating are limited. Most ceramic and polymeric matrices of commercial interest cannot be electroplated on reinforcing fibers. As the filaments or fibers comprise one of the electrodes, the reinforcing fiber must be conductive and fibers such as glass fibers and organic fibers cannot be electroplated.

Powder coating of tow is the most recent method developed in making prepreg. The significant advantages are that no solvent is required and no high stress is introduced in the process. The ultimate goal for almost all powder coating applications is the ability to deposit a thin, even thickness, high quality coating as efficiently as possible. The powdered resin also must be solid at ambient and elevated storage temperatures, and be capable of melting sharply to low viscosity to permit flow and to penetrate the fiber tow when heated. Dry powder coating has many advantages because the elimination of a wet base, solvent or water, facilitates reclamation of the coating material. This is an important economic advantage that promises a potential 100% utilization of powder plus elimination of expensive solvents that are flushed off and inevitably wasted. Thus, powder coating was conceived and has grown largely on these potential benefits.

Another method of powder coating fibers with matrix is the ATOCHEM method of impregnating fibers with dry thermoplastic polymer powder and then covering the towpreg with a thermoplastic sheath. However, as the matrix is not melted onto the fibers, only fibers in contact with the sheath are wetted with the matrix. Consolidating this composite also requires higher pressures under comparable processing conditions than completely wet-out towpreg. Furthermore, as in slurry coating, a fine polymer powder, generally less than 20 microns, is recommended for this process. Producing such fine powder from thermoplastics can be very expensive.

Towpreg must contain sufficient matrix, typically over 25% by volume, to permit consolidation of the components into a substantially void-free composite structure without requiring the incorporation of more matrix material. Linear towpreg can be converted into two and three dimensional product forms by weaving, braiding, filament winding, and other known processes. Alternatively, towpreg can be used to create a discontinuous fiber reinforced feedstock for molding by chopping, cutting, or like known processes.

BRIEF SUMMARY OF THE INVENTION

The flexible multiply towpreg tape according to the present invention is a powder fusion coated towpreg of known geometries. Typically, powder fusion coated towpregs made from fiber bundles are not well-characterized geometrically, leading to difficulties in using such towpregs for processes where an accurate geometry is vital for the production of high quality parts. The tape from powder fusion coated towpreg disclosed herein has a well-characterized geometry suitable for processes such as filament winding, advanced tow placement and pultrusion. In filament winding, the tow is wrapped around a mandrel in the shape of a final product. The lay-down head indexes across the mandrel a fixed distance as controlled by an open-loop controller. As an open-loop controller does not measure the width of the material, if the material is too narrow a gap is produced, and if the material is too wide an overlap is produced. Either of these defects can adversely affect the final part's properties. Advanced tow placement has requirements similar to those of filament winding.

In pultrusion, fiber bundles are pulled through a die to form a continuous two-dimensional shape. If the input material is not well-characterized geometrically, it will have to realign itself in the die, leading to a poor distribution of fibers in the final part, otherwise the materials and/or the die may fail. This can lead to an increase in pulling force, due, in part, to the friction generated as the fibers reposition themselves, leading to the failure of the fibers or even possibly the die. All of these defects point out the need for a powder fusion coated towpreg of known geometry. Additionally, processes such as filament winding and pultrusion require a flexible material as the input to assure high quality final products. The powder fusion coated tape resulting from this invention produces flexibility as well as geometric accuracy.

The flexible multiply towpreg according to the present invention, is produced by a three-step process: (1) The tow of reinforcing filaments is spread laterally to expose virtually all of the fibers or filaments to the environment; (2) the matrix material is contacted with the exposed spread filaments in a manner causing interfacial adhesion; and (3) the coated tow is forced into a gap of known geometry causing the tow to come together in the gap and form a flexible tape of known geometry.

In a first preferred embodiment the apparatus for producing the flexible towpreg tape comprises two cooperating rollers, one being generally concave and the other being generally convex, or one having an indented groove and the other having a protruding ridge corresponding to the indented groove, such that the protrusion of one roller fits within the indention of the other roller. A coated tow, generally as disclosed in the parent applications, both of which are incorporated herein by this reference, is passed between the two rollers that form an input powder fusion coated towpreg from the tow into a tape of known geometry. The rollers typically are forced together under a known pressure by conventional mechanisms, such as an air cylinder mounted on one of the rollers, springs, or hydraulic cylinders. The rollers are placed at the output end of a fusion coating line, or as a replacement for the fusion oven of a fusion coating line, such as that disclosed in the parent patent applications.

In a second preferred embodiment, the apparatus for producing the flexible towpreg tape comprises a single concave roller. A coated tow, generally as disclosed in the parent applications, is passed around a portion of the circumference of the roller. The coated tow is kept under tension as it passes around the roller such that the combination of tension and the concave configuration of the roller forces the coated tow generally toward the lowest point of the concave portion of the roller, thus forming a tape of the proper geometry. The tension can be created on the coated tow by the, for example, wind up rollers elsewhere in the apparatus. The single concave roller also is placed at the output end of a fusion coating line, or, if heated or if enough pressure is created, as a replacement for the fusion oven of a fusion coating line.

The primary object of this invention is to provide a flexible towpreg tape suitable for filament winding and pultrusion.

A further object of this invention is the production of commercially feasible towpreg tape from a variety of fibers and matrices.

Another object of this invention is to provide a flexible towpreg tape containing a sufficient number of filaments to be suitable for the economic production of composite structures.

An additional object of this invention is to provide a towpreg tape with the reinforcing fibers sufficiently wet-out that excessive pressure is not required to complete fiber wet-out during the consolidation of the composite.

It is another object of this invention to produce towpreg tape rapidly in order to minimize substantial curing or resin advancement of the matrix during towpreg manufacture.

Still another object of this invention is to permit production of towpreg tape starting with the matrix material in the form of inexpensive coarse powders.

These objects and others that will become apparent to one skilled in the art are achieved by the present invention as more fully described by the drawings and the detailed description of the invention below.

DETAILED DESCRIPTION OF THE DRAWINGS

FIG. 2 is a representation of the process of melting the matrix forming material onto the reinforcing filaments of the present invention with lateral constraint (FIG. 2a) and without lateral constraint (FIG. 2b) and a section of the neck of matrix forming material between filaments (FIG. 2c).

DETAILED DESCRIPTION OF THE INVENTION

1. General Theory

Figure 1:
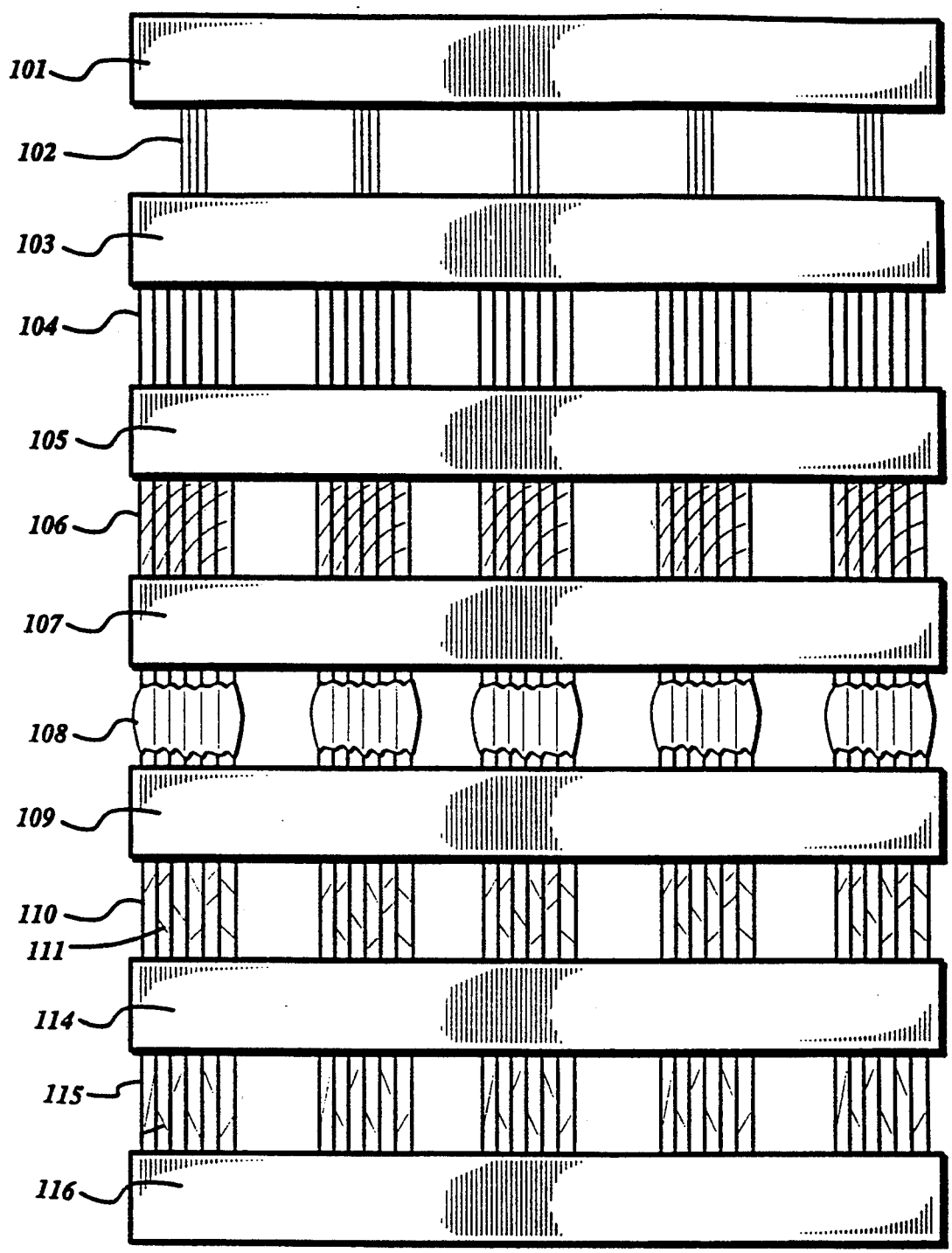
FIG. 1 is an overall flow diagram of the process of the present invention.
Figure 3:
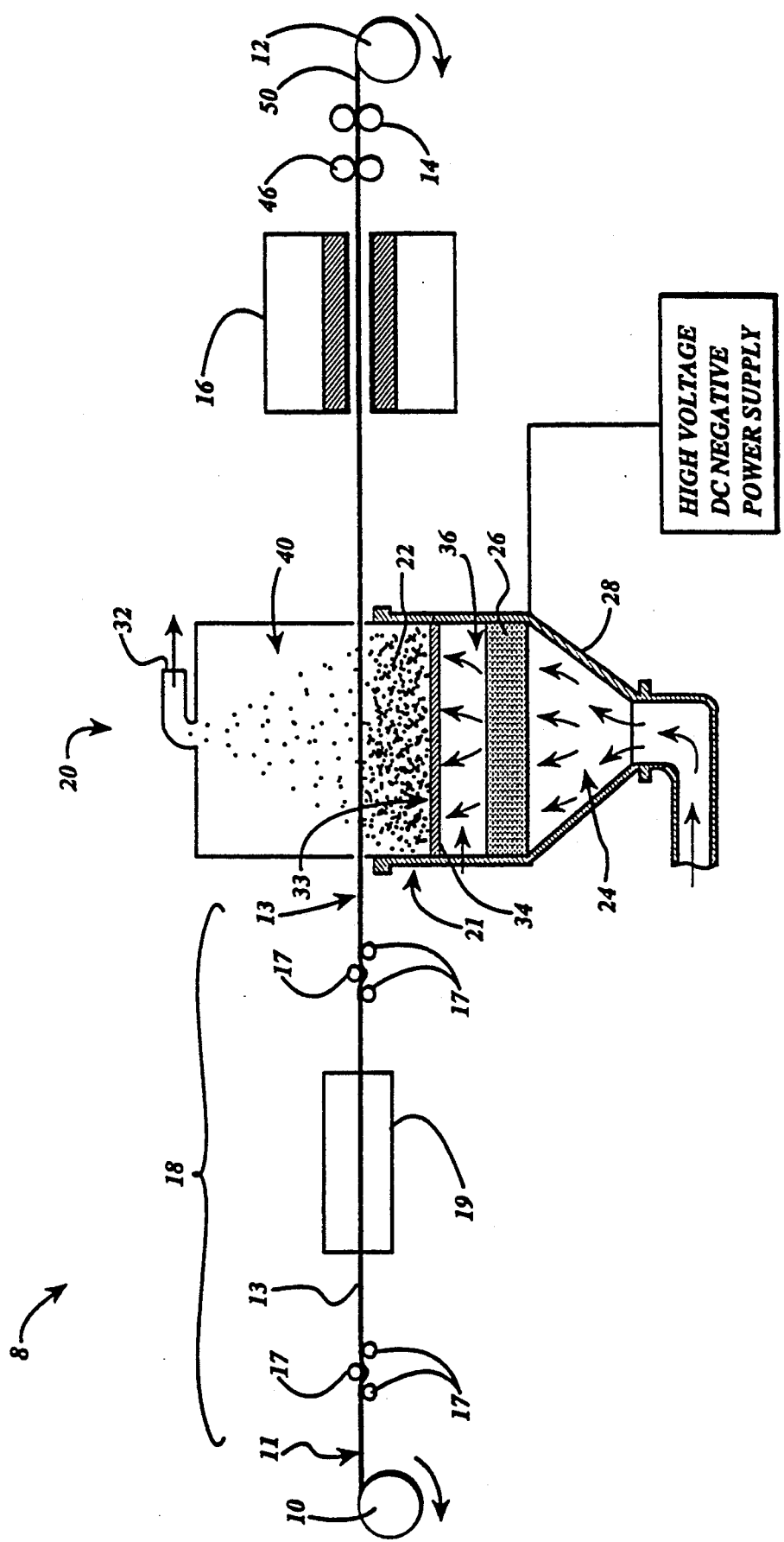
FIG. 3 is an overall schematic of the process of the present invention using Coating System Example I (electrostatic fluidized bed).

An important feature of this invention is the promotion of fiber or filament wetting or wet-out while minimizing the coalescence between wetted neighboring filaments. To prevent coalescence between coated filaments, it is necessary to keep the filaments as separated as possible until the matrix solidifies. One approach to keep the filaments separated is by restraining the lateral contraction of the filaments by maintaining an axial tension on the filaments. FIG. 2 illustrates the melting of a powder particle onto two filaments. In FIG. 2a, a high axial tension constrains the filaments from approaching each other. In FIG. 2b the axial tension on the filaments is low; hence, the filaments can approach each other laterally as the particle melts and wicks along the filaments.

In FIG. 2b-(c) the thickness of the melt between the two filaments is large even after the filaments are substantially wetted. By comparison, in FIG. 2a-(c) the thickness of the melt between the two filaments is substantially thinner than in FIG. 2b-(c) due to constraining the lateral movement of the filaments. Consequently, if desired, it is easy to separate the two coated filaments by fracturing the thin film between the two filaments. The result of this separation process is shown in FIG. 2a-(d).

Due to constraining the filaments, a tensile stress develops normal to the filament axis in the necked down melt between the filaments. This condition is illustrated in FIG. 2c. This tensile stress develops because material is drawn away from this interfilamentary area in order to spread along the filaments. The neck will fracture if this state of stress, $\sigma_N$, exceeds the failure stress, $\sigma_f$, for the melt.

The failure stress of the matrix can be used as a guide to determine suitable operating conditions for a particular matrix. For example, it is well known that low molecular weight molten materials have virtually negligible tensile failure stresses. It is also known that high molecular weight molten polymers lose strength as their operating temperature is increased. Similarly, partially solvated or plasticized polymers have lower tensile strength than neat polymers.

The thinness of the spread towpreg makes it possible to melt the polymer over a very short time period, and the polymer can be raised well above the normal safe temperature for the melt. In this manner, an extremely low elastic strength in the melt can be achieved. Conventional matrix forming material systems may operate at a temperature at or slightly above the melting temperature of the particular matrix forming material. The coating system of the present invention can operate at a temperature significantly higher than the softening temperature of the particular matrix forming material, and generally can operate at a temperature as high as the particular matrix forming material will withstand without incurring degrading reaction or resin advancement during the residence time within the system. The residence times used in this invention can be short enough such that no matrix forming material degradation or resin advancement is apparent. The temperature at which the oven operates is related to the residence time of the substrate/matrix material in the oven—higher temperatures can be used if residence time is reduced, and vice versa. In this manner, temperatures higher than the temperature at which the matrix material incurs degrading reaction or resin advancement occurs can be used, so long as the residence time is sufficiently short such that the matrix material does not remain at such a temperature for a length of time sufficient to allow the matrix material to incur degrading reaction or resin advancement.

The same conditions that lead to lower tensile strength in a viscoelastic liquid lead to lower surface tension and viscosity for the liquid. Thus, the same conditions that promote filament separation also promote spreading of the liquid along the filaments. Thus, the conversion in liquid shape depicted in FIG. 2a can be physically realized by manipulating material and operating conditions such that the elasticity of the liquid is minimized. By constraining or preventing lateral contraction of the filaments towards each other, the length of the neck before fracture, $L_n$, can be minimized. Thus, maintaining a high degree of tow spreading throughout wetting and solidification promotes separate filament coating.

In order to produce the towpreg tape of this invention, substantial wet-out of the fibers by the matrix material is desired such that the matrix-forming material has been liquefied sufficiently to achieve adhesion to the filaments without the use of a conventional adhesive or binder. Wet-out is accomplished in this example via the matrix material liquefier, such as a melter or oven, which, through heat, puts the matrix material into a liquid state. To achieve substantial wet-out, sufficient residence time in the apparatus selected to put the matrix in a liquid state and to allow the matrix material to sufficiently wet-out the fiber is required. There are various liquefiers available, including any of the radiation or conduction ovens. Radiation ovens are preferred for dry powder. Additionally, a hot die can be used in place of an oven.

As the matrix material is liquefied as part of this invention, it is possible to use any size particles of matrix material powder to coat the filaments, including coarse particles. The liquefaction of the matrix material and the wicking of the matrix material along the filaments reduces the problem of coarse blending between matrix material and filament associated with applying large diameter particles to small diameter filaments. Therefore, the particle size of the matrix forming material in this invention is not critical and can range from the diameter or thickness of the filaments or smaller, which is the generally accepted size in the art for coating, to a diameter or thickness many times larger than that of the filaments, as in the present invention. The use of large diameter or thickness particles of matrix forming material also results in significant cost savings. After the fibers or filaments have been substantially wet-out, the liquefied matrix material generally coats an entire bundle of fibers or filaments.

2. Preferred Materials

The various fibers that are useful as the tow fibers or filaments include glass fibers; carbon and graphite fibers; organic fibers, particularly liquid crystal fibers, such as aramids and aromatic polyesters, which are not low melting; ceramic fibers, such as silicon carbide; hybrid fibers, such as aramid/carbon, aramid/glass, aramid/carbon/glass, and carbon/glass fibers.

In general, fibers with a diameter or thickness greater that 25 microns are not useful. For example, there is no point in using a boron fiber with a diameter of 140 microns, as fibers of that thickness cannot be made very flexible. Furthermore, the fiber chosen should be a reinforcing type fiber and should be available in continuous form. Suitable fibers should be thermally stable at the temperatures involved in the matrix consolidation step. Additionally, suitable fibers must have glass transition and melting temperatures greater than room temperature and melting temperatures greater than the consolidation temperature of the composite.

Both thermoplastic and thermoset polymers are suitable for use as matrix materials. Preferred polymers generally should not be tacky and should have a glass transition or melting temperature greater than room temperature while in service and after curing. Preferably, the glass transition temperature should be greater than room temperature. Therefore, elastomers, rubbers, and leathers, which are not rigid at room temperature, are unsuitable for use as the matrix material. Thermosets, which can be tacky at process temperatures, can be processed cold to reduce tackiness and increase suitability as matrix materials. Non-polymer materials, such as copper and low melting point metals, also may be used as the matrix materials. The matrix material can be of any configuration, such as particles, powders, and short length fibers.

Example classes of polymers are the ABS group, acetals, acrylics, alkyd polyesters, allyls, aminos, epoxies, fluoroplastics, furans, melamines, nylons, phenolics, phenylene oxides and ethers, polyamides, polyamide-imides, polybutylenes, polycarbonates, polyesters, polyetheretherketones (PEEK), polyetherketones (PEK), polyetherketoneketones (PEKK), polyetherimides, polyethylenes, polyimides, polymethylpentenes, polyphenylene sulfides, polypropylenes, polystyrenes, polyurethanes, sulfones, ureas and vinyls. Copolymers, alloys and blends can be suitable polymer matrices.

Within these classes of polymers specific grades that are not tacky immediately following solidification after creating a multiply towpreg are preferred. In addition, thermosetting polymers should not be fully cured when the towpreg is initially solidified in order to permit bonding between the plies and tows when the composite part is finally cured. The preferred polymers for use as the matrix material include engineering polymers, such as polyetheretherketones, polyamides, epoxies, and polyesters.

3. Characteristics of Preferred Towpregs

ASTM D 1388 is a standard test method used to determine the stiffness of fabrics. This standard can be used to characterize the stiffness of the towpreg. Generally, a standard sample is 1 inch wide, however, measurements can be made on tows less than 1 inch wide, as long as the results are corrected for this difference. ASTM D 1388 is incorporated herein by reference.

A standard thermoplastic prepreg, such as APC 2 made by ICI, is 5 mils or 127 microns thick and has a flexural rigidity estimated to be 216,000 mg-cm. A towpreg with this flexural rigidity is very difficult to filament wind or subject to pultrusion. Thus, for filament winding or pultrusion applications, a thinner towpreg is preferred; that is, a multiply towpreg with an average thickness less than about 50 microns. Such towpregs are produced by this invention.

Flexibility is important for filament winding and pultrusion. The cantilever test method, ASTM D 1388-64 (1975), is used to calculate the flexural rigidity by measuring the bending length of the towpreg. Bending length is a measure of the interaction between the weight of the towpreg and its stiffness as indicated by the way in which a towpreg bends under its own weight. It reflects the stiffness of the towpreg when bent in one plane under the force of gravity, and is one component of drape.

The maximum elastic strain in the towpreg is at its surface. Reinforcing fibers typically cannot withstand compressive strains beyond 0.3% without buckling. For an elastic ply, this strain can be related to the ply thickness and minimum bending radius through the following expression:

$$h = 2R_{min}e$$

where:
h = the ply thickness.
$R_{min}$ = ply bending radius
e = maximum allowable surface strain.

For example, a towpreg subjected to a minimum bending radius of 10 mm and a maximum allowable strain of 0.3% cannot be more than 60 microns thick. The minimum bending radius depends on the part geometry and the maximum strain depends on the reinforcing fiber. Thus, thickness depends on both the material and application.

The towpreg of this invention is defined by its physical characteristics and, subject to these characteristics, can be composed of any combination of the tow filaments and matrix materials listed above. The following examples will help to illustrate several example towpregs suitable for forming the towpreg tapes of this invention.

EXAMPLE I

Carbon fiber tow filaments/PEEK matrix material.

Unsized 6K Hercules AS4 carbon fiber tow, each carbon fiber filament having a diameter of 8 microns, passes through an air banding jet that spreads the tow to about 50 mm wide. Rollers before and after the spreader create tension in the tow. The tow passes over an electrostatically charged bed containing PEEK 150 PF powder from ICI with an average particle size of 90 microns. The tow is grounded and the powder is charged at about −65 kV. The tow passes in spread condition under lateral tension, to prevent Collapse, through a tubular oven set at 450° C. to melt the PEEK. The tow is cooled in air and passed through drive rollers to a tension controlled winder. The residence times in the powder coater and the oven are 1.4 and 6.7 seconds, respectively. The line speed is 6.8 meters per minute, the fiber content of the towpreg is 60% by volume. The towpreg flexural rigidity is 890 mg-cm compared to 670 mg-cm for the uncoated tow. By comparison, consolidated tape has an estimated stiffness of 216,000 mg-cm.

EXAMPLE II

Glass tow filaments/PEEK matrix material.

A towpreg comprised of Owens Corning Fiberglass high temperature sized S2 glass with 4,080 filaments, each glass filament having a diameter of 9 microns, impregnated with PEEK matrix material is produced as in Example I. After the glass filament tow passes through the air banding jet and the rollers before and after the air banding jet, the tow is wiped by a wet sponge to improve surface conductivity. Then the tow passes over the electrostatically charged bed containing the PEEK 150 PF powder from ICI with an average particle size of 90 microns. The tow is grounded and the powder charged at about −70 kV. The tow passes, in a spread condition under lateral tension to prevent collapse, through the tubular oven set at 450° C. to melt the PEEK. The tow is cooled in air and passed through drive rollers to a tension controlled winder. The residence times in the powder coater and oven are 5.2 and 26.3 seconds, respectively. The line speed is 1.7 meters per minute. The fiber content of the towpreg is 60% by volume.

EXAMPLE III

Carbon fiber tow/LaRC-TPI matrix material.

A towpreg comprised of unsized 6K Hercules AS4 carbon fiber tow, each carbon fiber filament having a diameter of 8 microns, impregnated with LaRC TPI, a thermoplastic polyimide, is produced as in Example I. After the carbon fiber filament tow passes through the air banding jet and the rollers before and after the air banding jet, the tow passes over the electrostatically charged bed containing the LaRC-TPI powder from Rogers Corp. with an average particle size of 35 microns. The tow is grounded and the powder charged at about −67 kV. The tow passes in spread condition under lateral tension, to prevent collapse, through the tubular oven set at 400° C. to melt the TPI. The tow is cooled in air and then passes through drive rollers to a tension controlled winder. The residence times in the powder coater and oven are 3.2 and 16 seconds, respectively. The line speed is 2.9 meters per minute. The fiber content of the towpreg is 37% by volume. The towpreg flexural rigidity is 7,000 mg-cm compared to 670 mg-cm for the uncoated tow.

4. Preferred Method For Producing Towpreg Tape

The method of this invention for producing the towpreg of this invention is shown in a simplified flow process chart in FIG. 1. This method should be read in conjunction with the more detailed description disclosed in the description of the preferred apparatus below. The tow 102 is supplied during the let-off step 101, which can be bobbins or spools of tow, tow from an upstream process, or from any other tow supply. The tow 102 consists of many individual filaments 104 which are spread or separated from each other, so as to form a lateral spread of individual filaments 104, in the spreading step 103. The now spread filaments 104 are coated with matrix forming material during the coating step 105. After the filaments 104 are sufficiently coated 106 with matrix forming material, the matrix forming material is liquefied in wet-out step 107, forming sufficiently wet-out tow 108.

The wet-out tow 108 is then formed into a powder fusion coated towpreg of known geometry, typically through the use of a combination of forming means and heating means during the formation step 109. The towpreg also is solidified during the formation step 109 resulting in a formed tape 110 of known geometry.

The tape 110 is pulled through the method by a pulling means 114 so as to keep the tow 102 moving and to place axial tension on the filaments 104 so the individual filaments 104 do not collapse upon themselves, thus forming a mass of filaments and matrix material.

5. Preferred Apparatus For Producing Towpreg Tape

It should be noted that the above steps define the method of this invention and are not to be limited to the specific examples given throughout this specification. However, to better understand the above steps, the example below is provided with reference to the specific apparatus 8 shown in FIGS. 3–8.

The tow 11 supplied on let-off wheel 10 is drawn through the apparatus 8 and secured to take-up wheel 12. The take-up wheel 12 is rotated at a variable speed and the let-off wheel 10 is not necessarily driven. A constant tension winding on take-up wheel 12 is maintained by adjusting the winder motor (not shown) speed with a tension controller (not shown). The tow let-off in this example is taken directly from bobbins of wound tow. The tow can also come directly from upstream processes. During let-off, it is important to avoid twisting the filaments 13 making up the tow 11 as twisted filaments 13 are more difficult to separate. Additionally, it is helpful to control the tension on each individual bobbin of tow to keep the line tension constant throughout the impregnating process. A tow guide plate (not shown) may be placed between the let-off mechanism and the tow spreader to aid in guiding the tow through the tow spreader.

The tow spreader 18 in this example uses a series of 6 rollers 17, although the number of rollers is not critical, and an air comb 19 to spread the fiber tow 11 to individual filaments 13. The rollers 17 are arranged in two groups of three rollers each; one group located just before the air comb 19 and one group located just after the air comb 19. The two main purposes of the rollers 17 are: (1) to provide tension to the tow thus reducing the amount of lateral collapse of the tow onto itself during the process; and (2) to reduce the vibration of the tow. The rollers 17 can be made of any material and have any surface characteristics; however, smooth Teflon rollers are preferred as they provide for good spreading of the tow. At least one of the rollers 17, preferably the one immediately before the coating system 20, must be made of a conducting material, stainless steel being preferred, so as to ground the tow 11 before it enters the coating system 20. The air comb 19 is already known in the art.

The tow 11, after leaving the let-off wheel 10, enters the first group of rollers 17 where the filaments 13 are spread. The configuration of this first group of rollers 17 allows the tow to weave through the first group of three rollers 17, passing over the first roller, under the second roller and over the third roller, helping to impart a constant tension on and to reduce the vibration of the tow filaments 13. The tow 11 then enters the air comb 19 where forced air further spreads the filaments 13. After leaving the air comb 19, the tow 11 enters the second group of rollers 17 where the filaments 13 are further spread. The configuration of this second group of rollers 17 is similar to the configuration of the first group of rollers 17 for the same reasons. As mentioned previously, it is preferred that the final roller in this second group of rollers be made of a conducting material so as to ground the tow prior to entering the coating system 20.

Various other tow spreader 18 methods are available, including smooth, grooved or crowned rollers or drums; air combs; a combination of air combs and rollers or drums; air banding jets; ultrasonic spreaders; and liquid baths. Of prime concern in choosing a tow spreading method is that the method chosen will spread the tow into a columnated tape preferably only one filament thick and that the method will not damage the tow fibers or filaments.

Additional subprocesses may be included between the tow spreader 18 and the coating bed system 20 as required in the various applications. For example, equipment for desizing, surface activation, and application of adhesion promoters may be desired to produce a towpreg desired for a specific application.

The tow filaments 13 next enter a coating system 20 where the matrix material is applied to the tow filaments 13. As the filaments enter and pass through the coating system 20, the spread of the filaments 13 is maintained. Many different coating systems 20 are useful and are discussed below. An electrostatic fluidized bed system is a preferred coating system 20. Various other coating systems 20, such as wet powder, hot melt, solution, and powder spray coating also are suitable.

a. Electrostatic Fluidized Bed Coating

The fluidized bed coating system 20 comprises an enclosure 21 within which the matrix material powder 22 is confined. By a combination of air flow 24 and mechanical vibration, the powder 22 is fluidized and simultaneously electrically charged by means of high voltage electrodes 26 situated at or near the base of the container 28. The electrode 26 may be sharp points or, more usually, small diameter wires. At the top of the coater enclosure 21 there is an open port 32 to allow the escape of the fluidizing air 24.

Passing the tow 11 over and under rollers connected to a metal frame is one procedure to simultaneously ground and spread the fibers. With greater spreading, more powder can be picked up and greater flexibility of product results because the towpreg is thinner. When the fiber tow is not spread prior to coating, the towpreg emerges in a round brittle state and the fibers within the tow are not totally coated.

The powder particles 22 are uniformly dispersed in the container 28. Porous plate 34 provides for a very high resistance to travel of air 24 through the plate 34 while permitting passage of sufficient air 24 at low velocity to fluidize the powder 22. The mechanical vibration of the porous plate 34 is used to enhance fluidization and to reduce the possibility of air channeling and powder clumps. The depth of powder material 22 in the bed 33 is usually two to four inches (50 to 100 mm).

In the fluidized bed system 20, individual particles of the powder 22 adhere electrostatically to the fibers. The charged particles of powder 22 repel each other to such a degree that they rise above the chamber container 21 forming a cloud 40 of charged particles, through which the fibers are passed. In this example, a model C30 electrostatic fluidized bed coater from Electrostatic Technology Incorporated is used. The bed dimensions are 6×6 inches. The electrical output is 0–90 kV and the air input is 0–12.5 standard cubic feet per minute (SCFM). The fluidized bed system 20 also incorporates an ionized air system 36 created by charging electrodes 26 below the fluidized bed 33 to prevent the unintentional ignition of the fluidized powder 22 by electrical sparking.

The fluidizing air 24 used in conjunction with this process must be dry and clean because contaminants within the air supply would result in blocking the porous plate 34 and uneven fluidization. Moisture in the air causes the powder 22 to pack on the fluidized bed 33 causing reduced fluidization efficiency. Normally dry air 24 at a pressure of 30 to 80 psi supplied at a rate of approximately 5 cu.ft./min per square foot of diffuser plate 34 is appropriate. The fluidized powder 22 is maintained in the fluidized state by controlling the air flow 24. A typical method for drying the fluidizing air 24 is to use a cylindrical chamber (not shown) filled with silica gel. Wet air enters the dryer and moves through a mesh screen into the silica gel. Moisture is separated out in the chamber. Dry air 24 then flows through the outlet to the fluidized bed 33.

The voltages employed in the fluidized bed system 20 are usually from between about −30 to about −100 kV. In most cases, negative polarity is used. The output voltage should be approximately −100 kV maximum and the maximum output energy when the system 20 is shorted to ground must not be greater than the ignition energy of the particular materials 22 being applied. The high voltage required depends on the powder being used and generally ranges from about −35 to about −90 kV. For example, polyester powders achieve a better coating when charged at −40 kV or less; epoxy powders perform well in the range from −40 to −70 kV; vinyl powders generally require a higher charge, on the order of −60 to −75 kV, and for PEEK, good powder pickup occurred at −70 to −90 kV.

A vacuum exhaust system (not shown) is positioned to collect and return the excess coating powder to the powder supply reservoir (not shown). A typical exhaust system consists of one or more cyclones or bag filters (not shown), or a combination of both. Top exhaust, entrance and exit port exhaust, or perimeter exhaust are all techniques that can be applied. The velocity of exhaust air should be about the same as the velocity of the inlet air flow 24. In this example, the exhaust system employs a cartridge type exhaust to recover powder by collecting the powder in a vacuum bag filter. Powder is drawn to the cartridge by air suction, and then recovered by shaking the pocket or the bag filter inside the cartridge.

Figure 4:
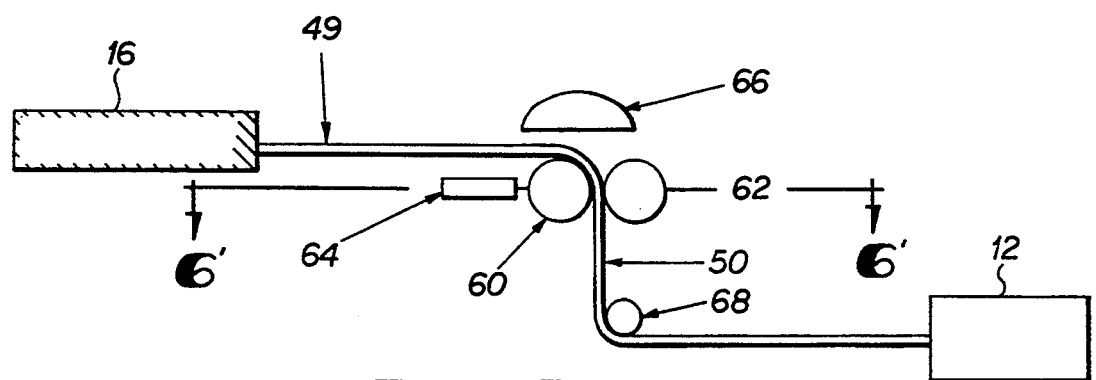
FIG. 4 is a detailed schematic of the tape formation means of the present invention.
Figure 5:
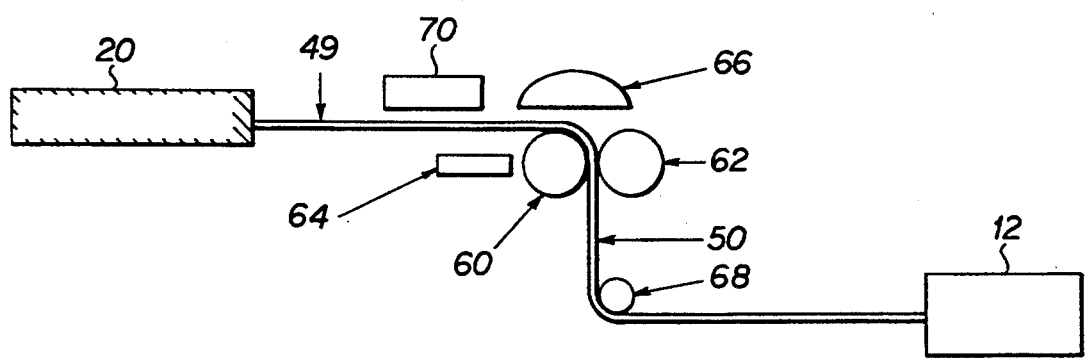
FIG. 5 is a detailed schematic of the tape formation means of the present invention in an ovenless embodiment.

The coated fiber next enters the oven 16 as shown in FIG. 4, or is introduced directly to a ceramic heater 70 as shown in FIG. 5. This should be accomplished as soon as it leaves the fluidized bed system 20 in order to melt the powder 22 onto the fibers before the decay of charge or charge relaxation occurs and the powder falls off the fibers. The oven 16 or ceramic heater 70 temperature depends on the fiber and the powder 22 and the residence time. However, the combination of oven 16 or ceramic heater 70 temperature and residence time within the oven 16 or heater 70 should be set to insure that the decomposition temperature of the powder 22 resin is not achieved, for the residence time the coated fibers are in the oven 16 or heater 70. The coated tow can be heated by either convection or radiant heating.

b. Wet Powder Coating

An alternative method of coating the tow filaments with the matrix material is a wet powder process such as slurry or emulsion coating. In wet powder coating, there is no need to ground the fiber tow prior to entering the coating system, therefore, the stainless steel roller mentioned above is not necessary. After leaving the tow spreader, the filaments are drawn through an optional primer for applying an adhesion promoter.

After leaving the primer, the filaments travel into the wet powder coating system proper which comprises a roll coater, a wet powder or emulsion reservoir, and a slurry pump. The matrix material powder is suspended in a liquid medium which can be either water or solvent based. The water based medium includes water and, possibly, a water soluble binder, and the solvent based medium contains a solvent and an optional dissolved binder. The filaments travel over the top surface of the roll coater which rotates generally in a direction complimentary to the direction of filament travel. The lower surface of the roll coater contacts the slurry or emulsion in the reservoir and becomes coated with the slurry or emulsion. As the roll coater rotates, it brings the slurry emulsion to its top surface where it contacts and coats the traveling filaments. The slurry pump maintains the slurry or emulsion in a uniform concentration.

The coated filament leaves the roll coater area and enters a drier where the water or solvent are evaporated from the slurry coating the filaments. The water soluble binder may be removed provided the resin is fused to the filaments. An alternative to using a roll coater in the wet powder coating system is to draw the filaments directly through the slurry or emulsion itself. After being drawn through the slurry or emulsion, the filaments then travel directly to the drier. The now dry filaments leave the drier and enter an oven 16 or ceramic heater 70 where the matrix material is liquefied and wets the filaments.

c. Hot Melt Coating

Another alternative coating system is a hot melt system comprised of a roll coater or an extruder and die. The hot melt system utilizes the roll coater, operates in the same manner as the wet powder coating system described above, with the exception that the slurry or emulsion reservoir is replaced with a melt reservoir containing the hot melt of the matrix material. As in the wet powder coating system, the roll coater is optional as the filaments can be drawn directly through the hot melt reservoir. The hot melt coating system utilizing the extruder and die operates by pulling the spread filaments through a slit die supplied with hot melt by an extruder. The matrix material coats the tow filaments in the die. The die land is grooved to facilitate splitting the towpreg into multiple plies. Fiber wet-out starts as soon as the hot melt of the matrix forming material contacts the filaments. Therefore, an oven 16 or ceramic heater 70 to accomplish further wetting may not be necessary. Special provisions, such as a grooved die or roll coater, may be necessary to facilitate splitting the towpreg into multiple plies.

d. Solution Coating

Another alternative coating system is a solution coating system utilizing various solvents. In this system, the matrix material is dissolved in an applicable solvent and the fiber tow is drawn through this matrix material/solvent solution or over a solution coated roller so as to coat the filaments. The coated filaments then optionally may be passed through a drier to evaporate the solvent. The now dry coated filaments enter an oven 16 or ceramic heater 70 where the matrix material melts and wets the tow fibers.

e. Powder Spray Coating

Powder spray coating of the fibers by the matrix material particles can be accomplished using an electrostatic or tribostatic (tribocharging) spray gun. In its simplest design, an electrostatic spray gun is a tube with a charging electrode attached to a high-voltage generator. Powder particles are directed through the gun tube, typically by a forced air flow, and charged by the electrode. The charged powder particles are directed at the substrate, in this case the fibers, where they adhere to and coat the substrate. The substrate is grounded such that an opposite charge relationship is created between the charged powder particles and the substrate.

In the present invention, the electrostatic spray gun is contained within a powder chamber which replaces the fluidized bed. The fibers leave the spreader and enter the powder chamber. Matrix material powder is fed to the spray gun where it is charged and directed at the fibers, which are grounded. Some charged powder particles adhere to and coat the fibers, while the remainder is recycled to the spray gun. The coated fibers exit the powder chamber and proceed to the oven.

The air flow through the spray gun, the powder flow input and the electrostatic control are all variable and values are selected based primarily on the fiber and matrix material being used. For example, using a Ransburg-Gema AG unit type 701-6 electrostatic spray gun to coat 12K carbon fibers spread to 2 inches with less than 150 micron nylon 11 powder with some carbon black pigment, various settings can be used to accomplish coating. The Ransburg-Gema unit allows an air flow "level" of 0–7, a powder flow "level" of 0–10, and an electrostatic setting of 0––80 kV. The following Table I presents coating parameters and values.

TABLE I

| | Coating Values | | | |
|---|---|---|---|---|
| Line Speed (ft/min) | Air Flow Level | Powder Flow Level | Electrostatic Setting (−kV) | % Matrix By Weight |
| 11.8 | 1.5 | 4.5 | 25 | 34.8 |
| 20.7 | 2.0 | 6.0 | 15 | 41.0 |
| 27.5 | 2.0 | 10.0 | 7 | 43.5 |
| 45.5 | 2.0 | 10.0 | 7 | 30.0 |

6. Post-Coating Treatment To Form Tape

Figure 6:
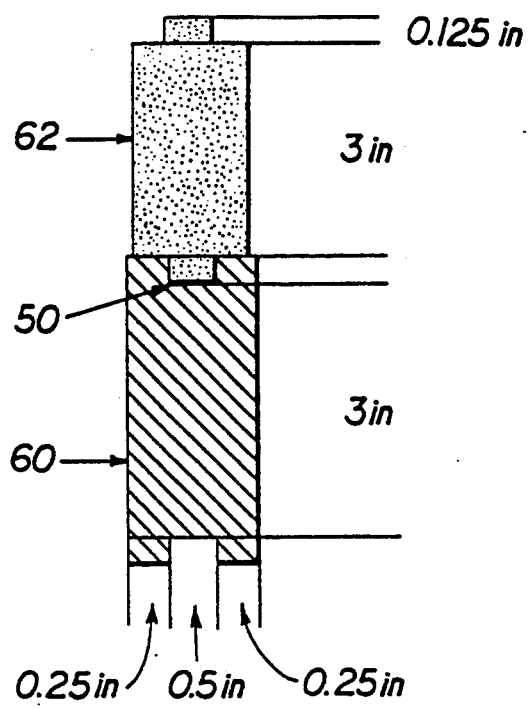
FIG. 6 is a cross-section of the ridged roller and the grooved roller taken along line 6—6 of FIG. 4.
Figure 7A:
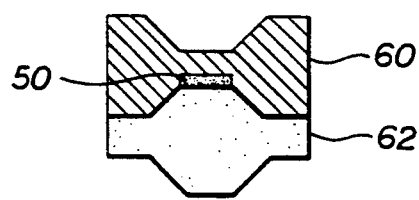
FIG. 7a and FIG. 7b are alternate embodiments of the rollers shown in FIG. 6.
Figure 7B:
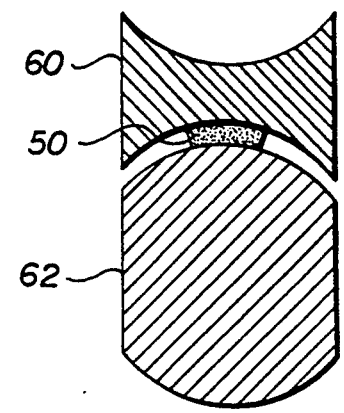

After the filaments 13 have been wet-out by the matrix forming material in the coating system 20, the towpreg 49 is introduced to the tape formation region 109 shown schematically in FIGS. 4 and 5. In a first preferred embodiment, the tape formation region comprises two cooperating rollers, a grooved roller 60 and a ridged roller 62. Two configurations of the grooved roller 60 and the ridged roller 62 are shown in FIGS. 6 and 7a. The ridge of ridged roller 62 cooperates with and fits within the groove of grooved roller 60. The powder fusion coated tow 49 passes between the grooved roller 60 and the ridged roller 62 forming an input powder fusion coated towpreg from tow 49 into a tape 50 of known geometry. FIG. 7a shows an alternative configuration of the grooved roller 60 and the ridged roller 62 with the groove being a generally concave configuration and the ridge being generally a convex configuration, the convex configuration cooperating with the concave configuration. As in the rollers 60, 62 shown in FIG. 7a, the convex structure of roller 62 cooperates with and fits within the concave structure of roller 60. The powder fusion coated tow 49 passes between roller 60 and roller 62 forming an input powder fusion coated towpreg from tow 49 into a tape 50 of known geometry. The rollers 60, 62 typically are forced together under a known pressure by an air cylinder 64 mounted on one of the rollers 60, 62, or by any other force-imparting mechanism, such as a spring or hydraulic cylinder.

The rollers 60, 62 are placed at the output end of the fusion coating line and correspond to tape formation region 109 shown in FIG. 1. As shown in FIG. 4, the rollers 60, 62 are placed in between the melting step 107, namely the oven 16, and the winding step 116, namely the take-up mechanism 12. In this embodiment, the powder fusion coated tow 49 exits the oven 16 and the tow 49 temperature is maintained by a heater 66 placed proximate to the rollers 60, 62 at their nip. A suitable heater 66 is a focused quartz infrared lamp, such as that produced by Argus under Model No. 74.285, approximately 2500 watts, controlled by a Stalo energy variac type 3PN1010. Grooved roller 60 is approximately 3 inches in diameter and 1 inch wide and has a 0.5 inch wide and 0.125 inch deep groove. Ridged roller 62 also is approximately 3 inches in diameter and 1 inch wide and has a 0.5 inch wide and 0.125 inch high ridge to cooperate with the groove.

The tow 49 is pulled through the rollers 60, 62 by take-up mechanism 12. When passing through the rollers 60, 62, one roller is forced against the other roller by the pressure means 64. A suitable pressure means 64 is an air cylinder such as that produced by Bimba, Model No. 091.5D, with a pressure controller such as the Speedaire 1Z838B regulator. A suitable air cylinder will produce a pressure on the tow 49 of approximately 20 psig for a 0.5 inch wide tow 49. When using a ridged roller 62, the tow 49 is forced into the gap between the rigid and the groove, which is of known geometry, by the ridge and groove geometry of the rollers 60, 62. This geometry causes the tow 49 to come together in the gap and form a flexible tape 50 of the known geometry. The groove of grooved roller 60 and the ridge of rigid roller 62 are selected by the user so as to produce a tape 50 of the desired known geometry. When using a convex roller 62, the tow 49 is forced into the region between the concave structure and the convex structure, causing the tow 49 to be forced together in this region and form a flexible tape 50 also of known geometry. The relative radii of the concave structure of roller 60 and the convex structure of roller 62 are selected by the user so as to produce a tape 50 of the desired known geometry. The rollers 60, 62 typically are cooled with air so as to solidify the matrix material so that the tape 50 can be handled. The tape 50 then passes around guide roller 68 and is wound in take-up mechanism 12.

In the embodiment shown in FIG. 5, the roller mechanism replaces the oven 16. When no oven 16 is used, a second heater 70 typically is necessary. A suitable heater is a ceramic heater produced by GTE Sylvania, 500 watts, 5×2.5 inches, controlled by a Barber-Coleman 560 controller. This heater 70 is used to melt the powder 22 onto the tow 13 to create the powder fusion coated tow 49. The powder fusion coated tow 49 then proceeds through the tape formation region 109 as described above with reference to FIG. 4.

The choice of the power densities of the heaters 66, 70 is dependant on the material and the speed of the line. For a 6K carbon fiber tow being coated with PEEK at 5 feet per minute and being made into a 0.5 inch wide tape, the above described apparatus is suitable.

Figure 8:
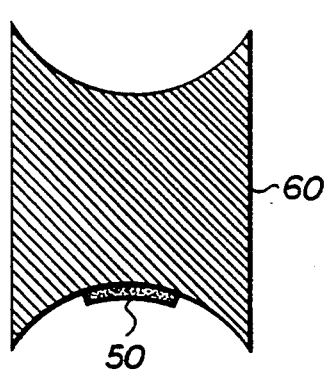
FIG. 8 is a cross-section of an alternate embodiment of the tape formation means utilizing a one roller configuration.
Figure 9:
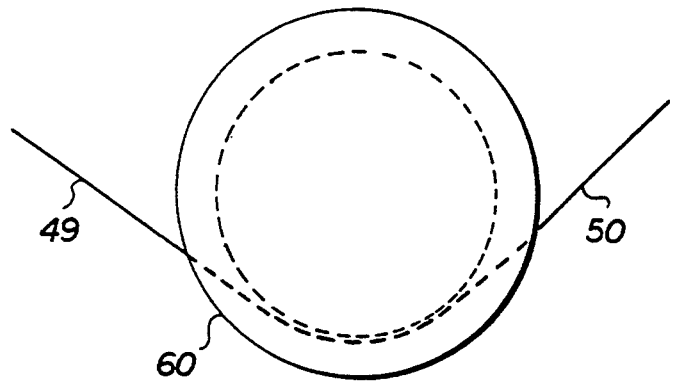
FIG. 9 is a side view of the one roller tape formation means shown in FIG. 8.

In a second preferred embodiment, the tape formation region comprises one crowned or convex roller 60, as shown in FIGS. 8 and 9. The powder fusion coated tow 49 is kept under tension as it passes along a portion of the circumference of roller 60. The combination of tension and the concave nature of roller 60 forces the powder fusion coated tow to the lowest point of the concave region forming an input powder fusion coated towpreg from tow 49 into a tape 50 of known geometry. The tension can be imparted to the powder fusion coated tow by the take-up mechanism 12 or other apparatuses not shown. By varying the relative radius of the concave structure of roller 60 and the amount of tension placed on the tow 49, the tow 49 can be forced to come together to a flexible tape 50 of a chosen known geometry. As above, roller 60, may be cooled so as to solidify the matrix material so that the tape 50 can be handled. The tape 50 then passes around guide roller 68 and is wound in take-up mechanism 12.

Figure 10:
FIG. 10 is a 50x photomicrograph of a cross-section of the towpreg tape of the present invention using glass fibers impregnated with polypropylene under 0 psi.
Figure 11:
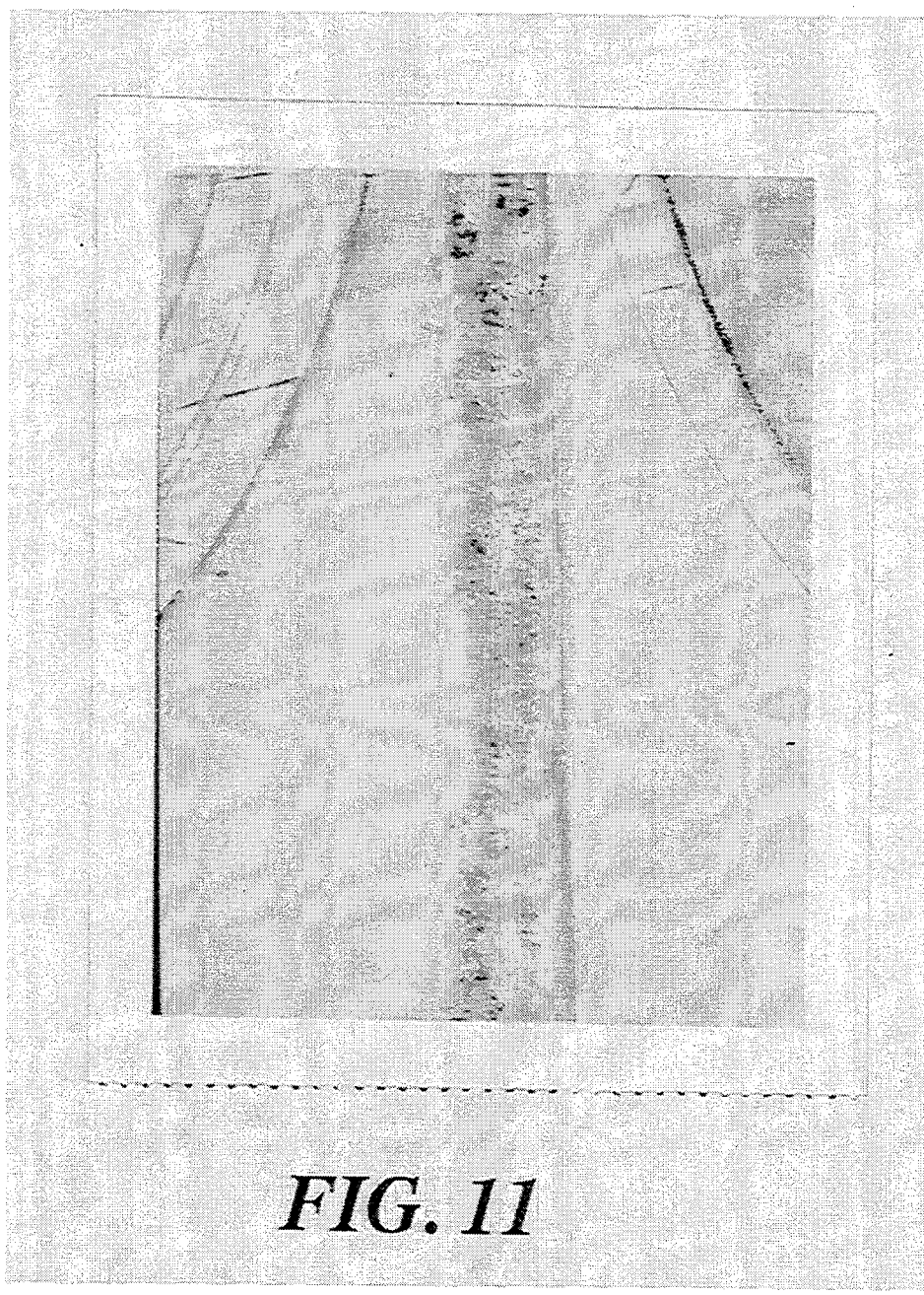
FIG. 11 is a 50x photomicrograph of a cross-section of the towpreg tape of the present invention using glass fibers impregnated with polypropylene under 20 psi.
Figure 12:
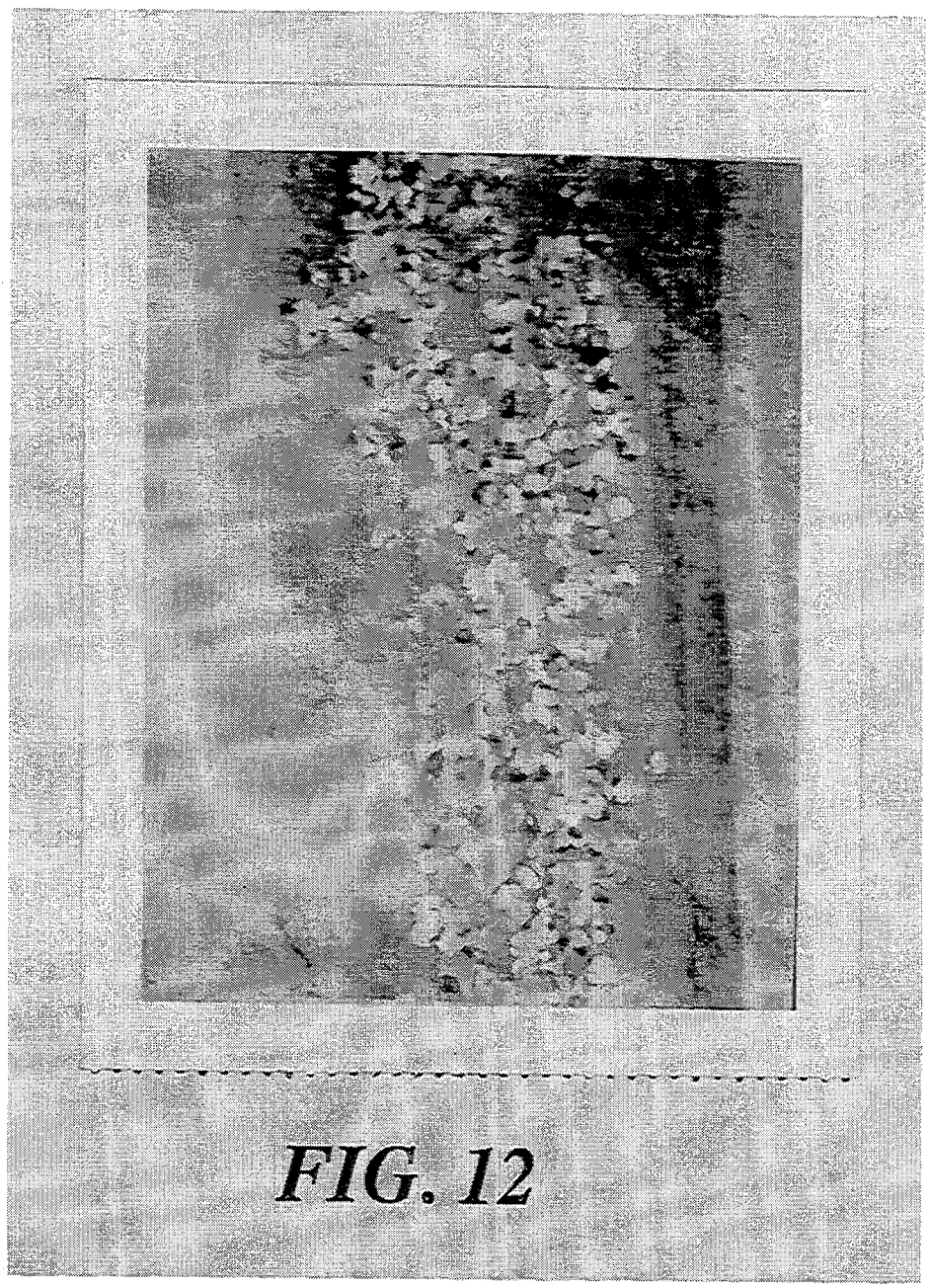
FIG. 12 is a 200x photomicrograph of a cross-section of the towpreg tape of the present invention using glass fibers impregnated with polypropylene under 20 psi.
Figure 13A:
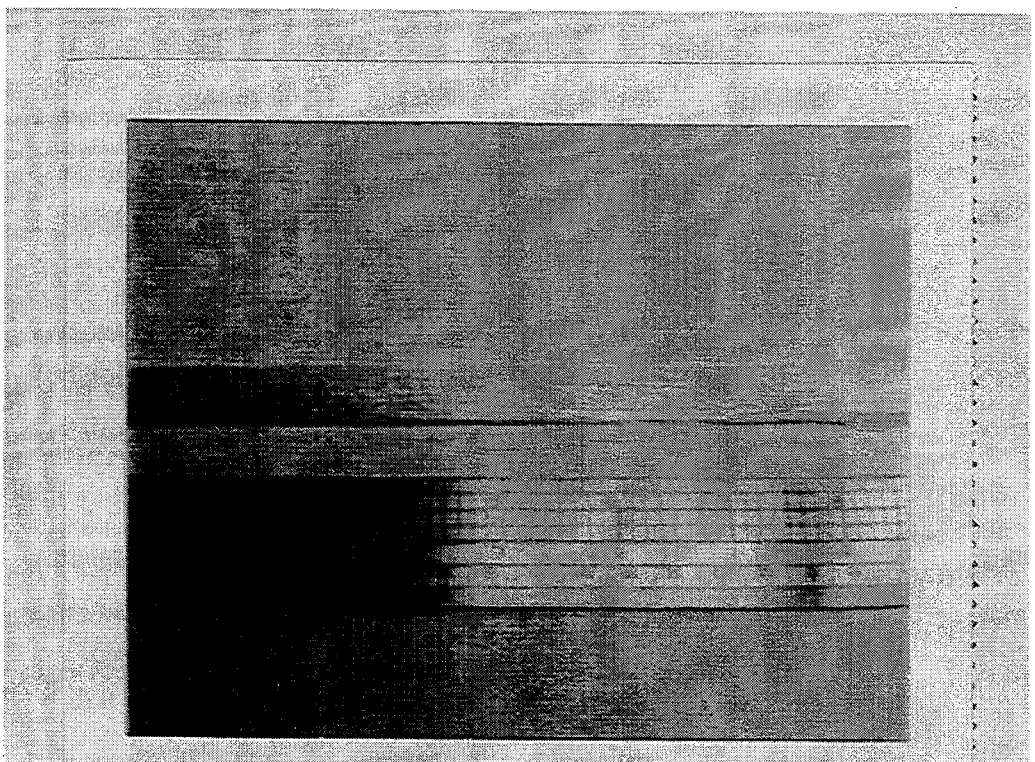
FIG. 13 are photographs of the tape of the present invention using polypropylene matrix material and glass fiber reinforcing filaments.
Figure 13B:
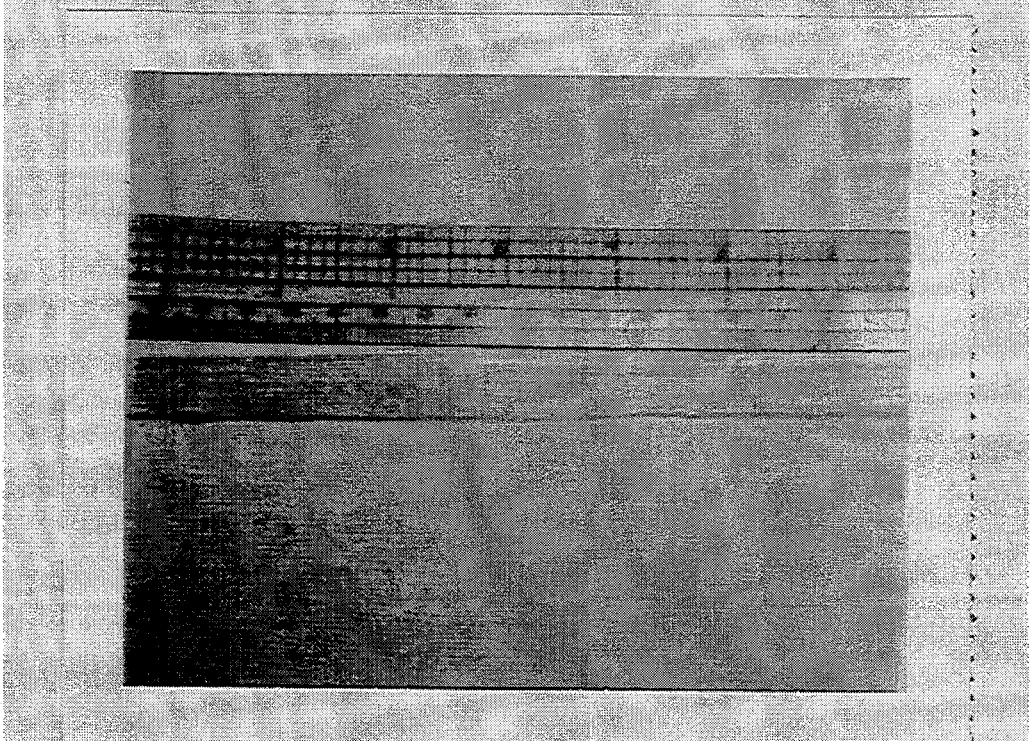

FIGS. 10, 11 and 12 are photomicrographs of cross-sections of the towpreg produced by the present invention using glass fiber filaments and a polypropylene matrix material. FIG. 13 are photographs of the tape produced by the present invention using polypropylene matrix material and glass fiber reinforcing filaments. FIG. 13a shows a tape produced from a tow having a line speed of 10 ft/min on which the matrix material was melted using a 114 IR lamp. 40 psi was exerted on the roller. FIG. 13b shows a tape produced from a tow having a line speed of 4.5 ft/min on which the matrix material was melted at 370° C. 20 psi was exerted on the roller.

The above description has been offered for illustrative purposes only, and is not intended to limit the scope and equivalents of the present invention, which is as defined in the claims below.

What is claimed is:

1. An improved flexible towpreg tape of a known geometry comprising a plurality of towpreg plies, said towpreg plies comprising reinforcing filaments and matrix forming material; said reinforcing filaments being substantially wet-out by said matrix forming material such that said towpreg plies have fewer voids than said towpreg tape, said towpreg plies having an average thickness less than 100 microns.

2. The improved flexible towpreg tape as claimed in claim 1, wherein said towpreg plies have an average thickness of between about 10 to 50 microns.

3. The improved flexible towpreg tape as claimed in claim 1, wherein said towpreg tape comprises a plurality of towpreg plies comprising said reinforcing filaments and said matrix forming material.

4. The improved flexible towpreg tape as claimed in claim 3, wherein said towpreg plies are connected to neighboring towpreg plies by a common reinforcing filament.

5. An improved flexible towpreg tape of a known geometry comprising reinforcing filaments and matrix forming material, produced by a process comprising the steps of:
   (a) providing reinforcing filaments and matrix forming material;
   (b) coating said reinforcing filaments with said matrix forming material;
   (c) forming a fusion coated towpreg by heating said reinforcing filaments and said matrix forming material such that said matrix forming material contacting said reinforcing filaments liquifies and coats said reinforcing filaments; and
   (d) subjecting said fusion coated towpreg to a forming force by passing said fusion coated towpreg through a forming means of known geometry, thus creating a fusion coated towpreg tape.

* * * * *